US005931732A

United States Patent [19]

Abe et al.

[11] Patent Number: 5,931,732

[45] Date of Patent: Aug. 3, 1999

[54] APPARATUS FOR DISPENSING DISKS

[75] Inventors: Hiroshi Abe; Tetsuo Furukawa, both of Iwatsuki, Japan

[73] Assignee: Asahi Seiko Co., Ltd., Tokyo, Japan

[21] Appl. No.: 08/857,233

[22] Filed: May 16, 1997

[30] Foreign Application Priority Data

| | | | |
|---|---|---|---|
| May 17, 1996 | [JP] | Japan | 8-160404 |
| Aug. 6, 1996 | [JP] | Japan | 8-237105 |

[51] Int. Cl.[6] .............................. G07D 1/00; B65G 59/00

[52] U.S. Cl. .............................. 453/50; 453/57; 221/252; 221/267

[58] Field of Search .................................. 453/50, 49, 57, 453/32; 221/252, 267; 194/344, 351

[56] References Cited

U.S. PATENT DOCUMENTS

| | | | |
|---|---|---|---|
| 542,815 | 7/1895 | Strack | 453/50 |
| 4,518,001 | 5/1985 | Branham | 453/49 |

FOREIGN PATENT DOCUMENTS

| | | | |
|---|---|---|---|
| 836707 | 1/1939 | France | 221/267 |
| 9002389 | 3/1990 | WIPO . | |
| 9527270 | 10/1995 | WIPO . | |

*Primary Examiner*—F. J. Bartuska
*Assistant Examiner*—Bryan J. Jaketic
*Attorney, Agent, or Firm*—Price Gess & Ubell

[57] ABSTRACT

An apparatus for dispensing disks comprising a disk passage having an outlet in which the disks are arranged edge-to-edge for storage and dispensing. A closure member, such as a rotatable spherical member, is provided for closing the outlet. The closure member is arranged to apply force to a face of a disk in the region of the outlet whereby the disk is dispensed from the outlet through a guide assembly. The closure member is opened by the camming action of the disk in the region of the outlet. A spring plate is provided to bias the closure member towards a closed position wherein the outlet is normally closed.

31 Claims, 9 Drawing Sheets

APPARATUS FOR DISPENSING DISKS

BACKGROUND OF THE INVENTION

1. Field of the Invention

The present invention relates to apparatus for dispensing disks, such as coins or medals, from a storage hopper in a game or arcade console and, more particularly, a device to control the ejection of the disks.

2. Description of Related Art

A conventional coin handling apparatus is described in U.S. Pat. No. 4,518,001 and is shown in FIG. 9. The coin handling apparatus shown in FIG. 9 includes a hopper (101) payout assembly and an elongated duct having front and back panes (114, 151), first and second edge panels (341, 321), and a channel (125) therein for receiving a stack of coins (181) of a given denomination in single edge-to-edge column, between an inlet end (113) and an outlet end (111). An inlet end (113) of the channel communicates with a payout chute (139) of the hopper, and a single outlet slot (301) is provided in the first edge panel (341) at the outlet end (111).

The above-mentioned coin handling apparatus comprises a coin ejector assembly including an ejector member for forcibly ejecting coins through the outlet slot (301). This ejector member comprises a roller extending into the channel (125) adjacent the outlet end (111) thereof.

The ejector member is rotatable about an axis substantially normal to the front and back panels (114, 151) and movable between a first position closer to the second edge panel (321) than the first edge panel (341) and off-center relative to the width of the channel (125) in a direction away from said outlet slot (301) and a second position further away from the outlet slot (301) than said first position. The coin ejector assembly includes biasing means (201) for urging said ejector member in said first position whereby the ejector member urges said coins toward the outlet slot (301) and forcibly ejects them therethrough. Since the ejected coins are ejected from the side of the duct, it is necessary to provide means at the side of the duct for receiving ejected coins. This presents a problem since in some cases insufficient space is available on the side of the duct. Accordingly, the art is still seeking an improved ejector assembly controlling the dispensing of coins.

OBJECTS AND SUMMARY OF THE INVENTION

The present invention provides an apparatus for dispensing disks comprising means defining a passage having an outlet in which the disks are arranged edge-to-edge in use; and a closure member for closing the outlet, wherein the closure member is arranged to apply force to a side face of a disk in the region of the outlet whereby the disk is dispensed from the outlet.

The present invention provides a particularly compact apparatus which enables the disks to be dispensed from the front or back of the passage. In addition, by applying force to a face of a disk, the disk is more reliably dispensed from the outlet. A closure member is provided both to close the outlet and to apply the force to the face of the disk. This results in a particularly simple and compact construction, and also ensures that the disk is reliably dispensed from the outlet.

The passage containing the disks may be curved. Typically, however, the passage lies in a plane, and the closure member is arranged to urge the disk out of the plane.

In a preferred embodiment, the disks in the passage are arranged in a single line.

Means may be provided for opening the closure member when a disk is to be dispensed from the outlet. Preferably, however, the closure member is opened by the action of the disk in the region of the outlet.

In a preferred embodiment, the apparatus further comprises biasing means which biases the closure member towards a closed position in which the outlet is closed. In this case, the biasing means typically also provides the force which is applied to the face of the disk. The biasing means can comprise a plate spring. Typically, the closure member comprises a rotatable member (such as a freely rotatable spherical body) which is engaged by the disk in the region of the outlet. The rotatable member provides a bearing or cam surface which reduces resistance to the disk passing through the outlet and enables the disk to remain in contact with a convex surface of the closure member as it passes through the, outlet to provide a detector for detecting the presence of the disk in the region of the outlet. Typically the detector provides a detection signal when the disk has been dispensed from the outlet.

In a preferred embodiment, the detector comprises a detection member which is biased towards and engaged by a disk in the region of the outlet. In this case, the biased detection member can provide a force which speeds up the ejection of the disk from the outlet.

The apparatus according to the present invention may be manufactured and sold separately from means for urging the disks in the passage towards the outlet (such as a conventional medal hopper). Alternatively, the apparatus may be provided with means for urging the disks in the passage towards the outlet. A disk which has been dispensed from the outlet may fall down the front or back of the passage. Alternatively, means may be provided for guiding a disk which has been dispensed from the outlet to the side.

In the conventional apparatus of U.S. Pat. No. 4,518,001, it is only possible to eject disks from one side of the passage. In a preferred embodiment, the apparatus according to the present invention comprises a guide which is movable between first and second positions in which the disk is guided to the right or left. This enables disks to be ejected from either side of the outlet. Typically, the apparatus further comprises means (such as a solenoid) for moving the guide between its first and second position.

The apparatus according to the present invention is particularly suited for machines, such as vending machines which dispense medals, money changing machines etc. The apparatus may dispense disks which are not circular, but in general, the disks will have one or more faces and one or more edges, wherein the face has a greater area than the edge.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an apparatus dispensing disks.

Figure 1:
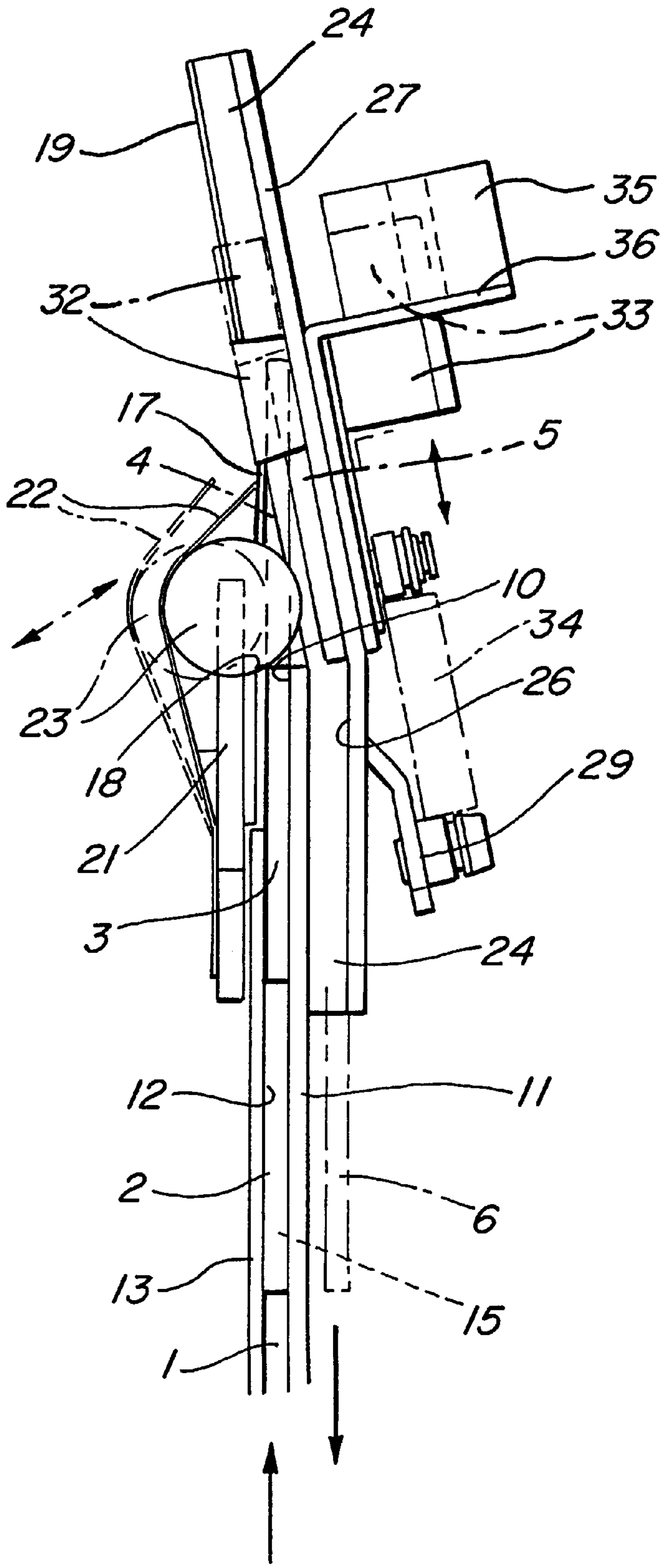
FIG. 1 is a side view in section of a first embodiment of apparatus according to the present invention.
Figure 2:
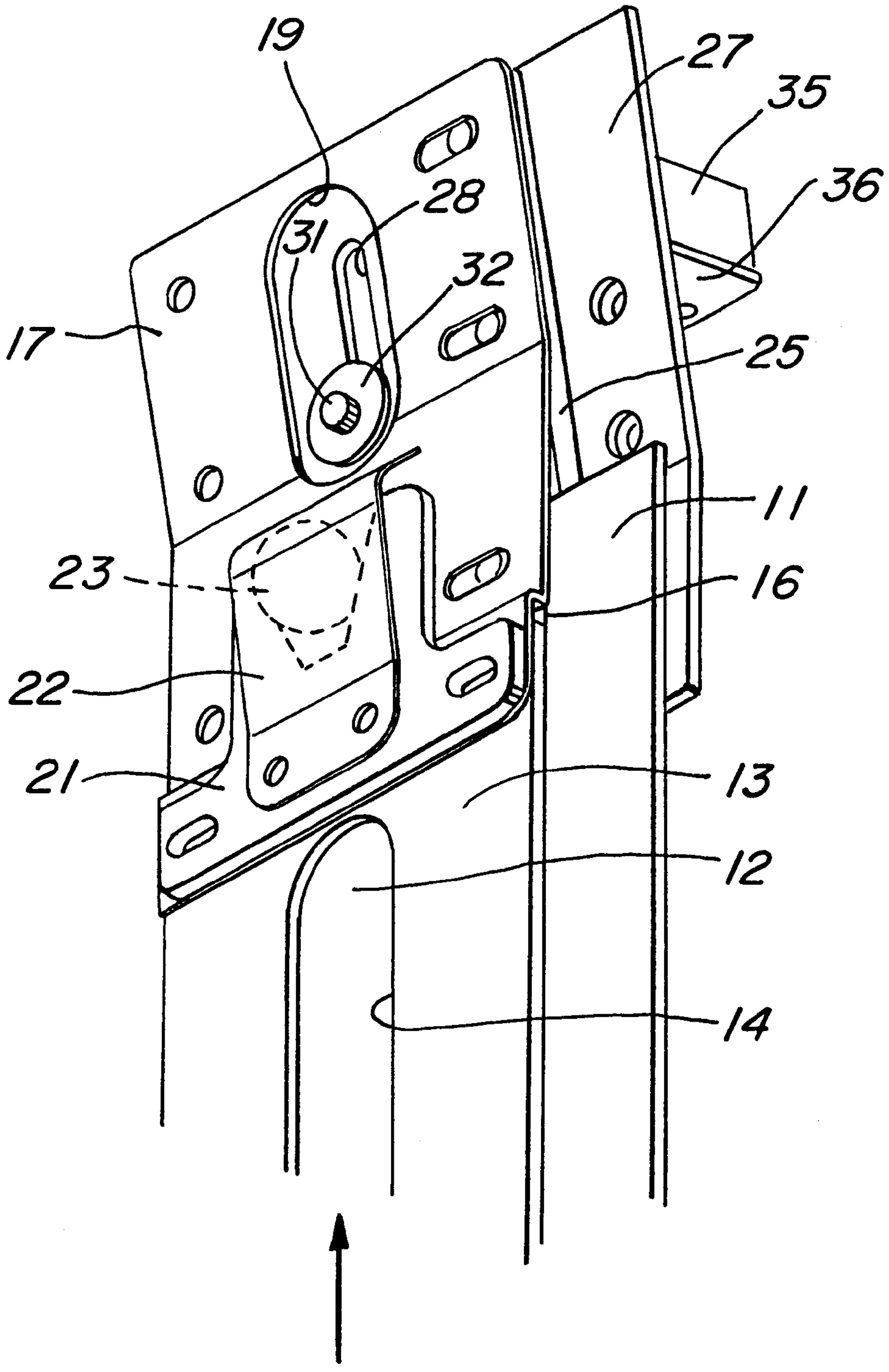
FIG. 2 is a perspective view of the front of the apparatus viewed from the left of FIG. 1.
Figure 3:
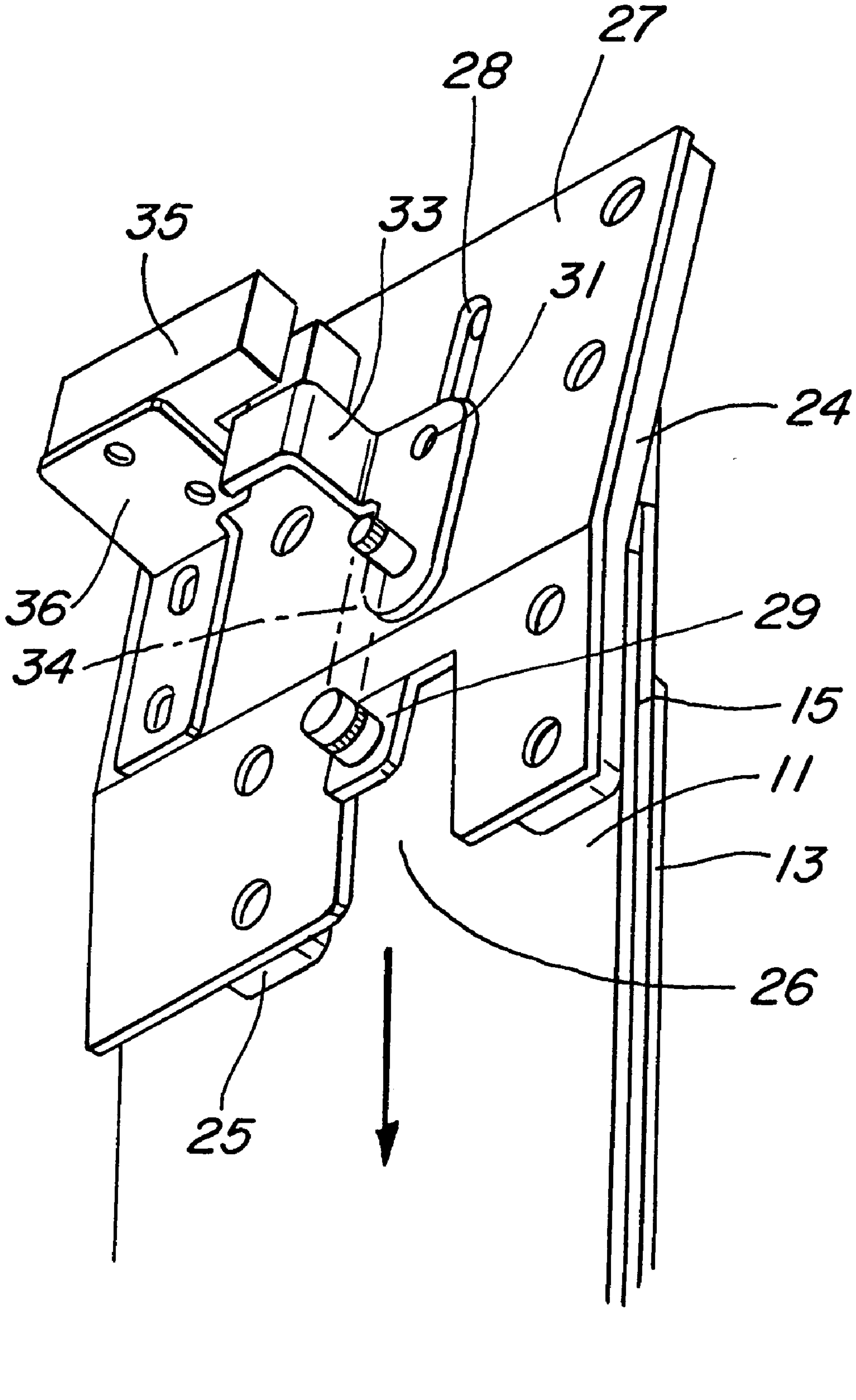
FIG. 3 is a perspective view of the back of the apparatus viewed from the right of FIG. 1.
Figure 9:
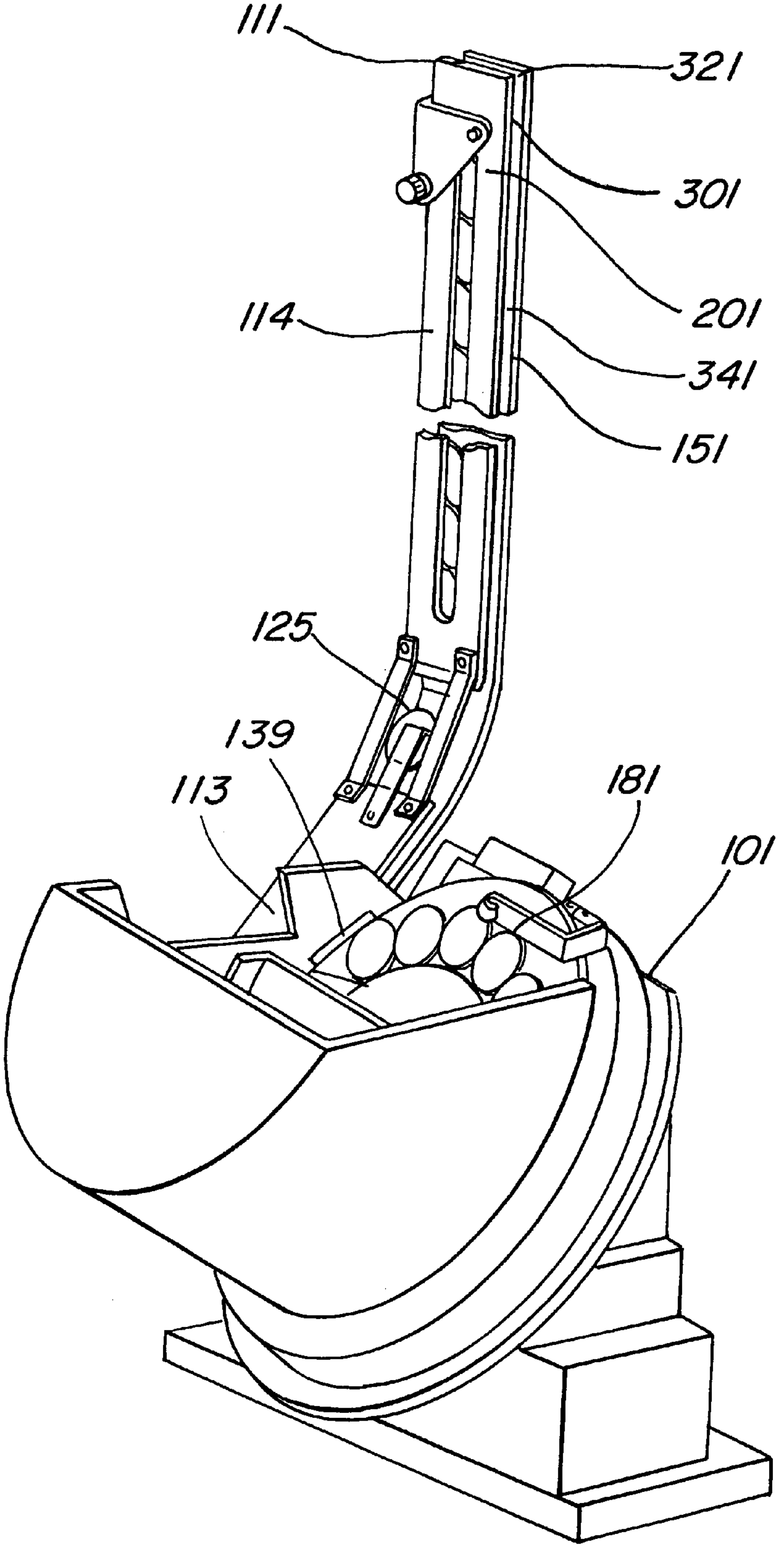
FIG. 9 illustrates a conventional coin handling apparatus as shown in U.S. Pat. No. 4,518,001.

FIGS. 1 to 3 illustrate an outlet part of an apparatus for dispensing disks or coins, such as a money changing machine. The terms "disks" and "coins" can be used interchangeably and can, for example, be a monetary coin, token, medal, etc. The outlet part is mounted on a hopper such as the hopper 101 illustrated in FIG. 9.

A rectangular back plate 11 defines a back wall of passage 12 to pass same shaped disk bodies 1, 2, and 3 which are pushed upwards in a line in the same posture. A rectangular front plate 13 is formed parallel to the back plate 11 and defines a front wall of the passage 12. The space between the back plate 11 and the front plate 13 is approximately equivalent to the thickness of any one of the disk bodies 1–3. Further, the top edge of the front plate 13 is lower than the top edge of the back plate 11, and a slot 14 is desirably formed in the center of the front plate 13. In addition, between the back plate 11 and the front plate 13, one pair of narrow edge plates 15, 16 are mounted to define side walls of the passage 12. The distance between the pair of edge plates 15, 16 is approximately equivalent to the diameter of any one of the disk bodies 1–3. Further, the edge plates 15, 16 are slightly thicker than the back plate 11. The thickness of the edge plates 15, 16 depends on the thickness of the disk bodies 1–3.

As above mentioned, the back plate 11, the front plate 13, and the pair of edge plates 15, 16 define the passage 12 for passing disk bodies 1–3 above. A top opening 10 of this passage 12 is defined by the top edge level of the back plate 11, as will be described in more detail later (referring to FIG. 1). A bent rectangular regulation plate 17 is shown in FIG. 2. The lower edge of this regulation plate 17 is bent and fixed on the upper edge of the front plate 13. At the center of regulation plate 17, a circular hole 18 is formed, and on the upper portion of regulation plate 17, a slot 19 is formed. An M-shaped plate which is shown under the regulation plate 17 is a holding plate 21 and, under this holding plate 21, the plate 21 is fixed on the lower edge of regulation plate 17.

An L-shaped plate spring 22 is fixed on the lower edge of the holding plate 21. A spherical body 23, which is shown at the center of FIG. 1 and FIG. 2, is inserted freely into the holding plate 21 to resist the elasticity power of plate spring 22 and, generally, the spherical body 23 is held by the circular hole 18 of regulation plate 17 and plate spring 22. Further, the holding plate 21 ensures that the spherical body 23 is not released on either side of FIG. 2.

On the back upper edge of the back plate 11, as shown in FIG. 3, the lower portions of one pair of edge plates 24, 25 define side walls of an open or fall passage 26 for disk bodies 1–3. The pair of edge plates 24, 25 are made out of rectangular rods which are slightly bent, as shown in FIG. 3. Further, the spacing between the pair of edge plates 24, 25 is approximately equivalent to the diameter of any one of the disk bodies 1–3.

The bent plate which is shown in FIG. 3 is a mounting plate 27. This mounting plate 27 spans between the pair of edge plates 24, 25, and defines a back wall of the fall passage 26 for the disk bodies 1–3. The spacing between the back plate 11 and mounting plate 27 is approximately equivalent to twice the thickness of any one of the disk bodies 1–3. Therefore, when the passage 12 must be adjusted according to the thickness of disk bodies 1–3, it is often not necessary to adjust the spacing between the plates 11, 27. In addition, as for the mounting plate 27, in the upper portion, a slot 28 is formed and, in the lower portion, a small projecting fragment 29 is formed.

A roller 32 is mounted on the front end of axle 31 which extends through slot 28. A bracket 33 is mounted to the rear end of axle 31. A tubular spring 34 spans between the movable bracket 33 and projecting fragment 29 and biases the movable bracket 33 in the direction of projecting fragment 29.

A laterally U-shaped sensor 35 detects the movement of movable bracket 33. The sensor 35 is a proximity switch but may also be a light sensor or magnetic sensor.

In addition, an L-shaped plate 36 fixes the sensor 35 on the mounting plate 27.

Also, the roller 32, movable bracket 33, spring 34, sensor 35 and so on constitute a detection means.

Items 4–6 in FIG. 1 illustrate the successive positions of uppermost disk 3 being dispensed. In this embodiment, when the disk bodies 1, 2, 3 are pushed up into passage 12, the upper edge of uppermost disk body 3 hits the spherical body 23. When disk body 3 is pushed further, as shown by the chain line of FIG. 1, the spherical body 23 is moved to the left side of FIG. 1, resisting the elasticity power of plate spring 22, and then the opening 10 in the passage 12 is opened. Therefore, the disk body 3 which is pushed up inside of the passage 12 is able to be moved further, and comes to the position indicated at 4. When the lower edge of disk body 3 in position 4 passes the upper edge of the back plate 11 in this way, with the elasticity restoration power of plate spring 23, the spherical body 22 returns to its original position. As a result, the disk at body position 4 is pushed out to the position indicated at 5 and the opening 10 in passage 12 is covered or closed.

The pushed out disk body at position 5 becomes free and falls in the fall passage 26.

In addition, when the disk body 3 moves from the position of disk body 3 shown in solid lines to the position 4 and, because the disk body 3 pushes up the roller 32, the movable bracket 33 moves up in opposition to the spring 34 and is detected by the sensor 35. The disk body 3 in position 5 which was pushed out by the spherical body 23 in this way becomes free and falls in the fall passage 26. In this case, the restoration power of spring 34 works and accelerates the fall of disk body 3 in position 5. Further, it is possible to say that the regulation plate 17, the circular hole 18, the holding plate 21, the plate spring 22, the spherical body 23 constitute a structure to enable the spherical body 23 to act as a closure member for opening and shutting the opening 10 in passage 12. In contrast with the embodiment of FIGS. 1–3, the plate spring 22 may have an integrally formed spherical part which replaces the spherical body 23.

Figure 4:
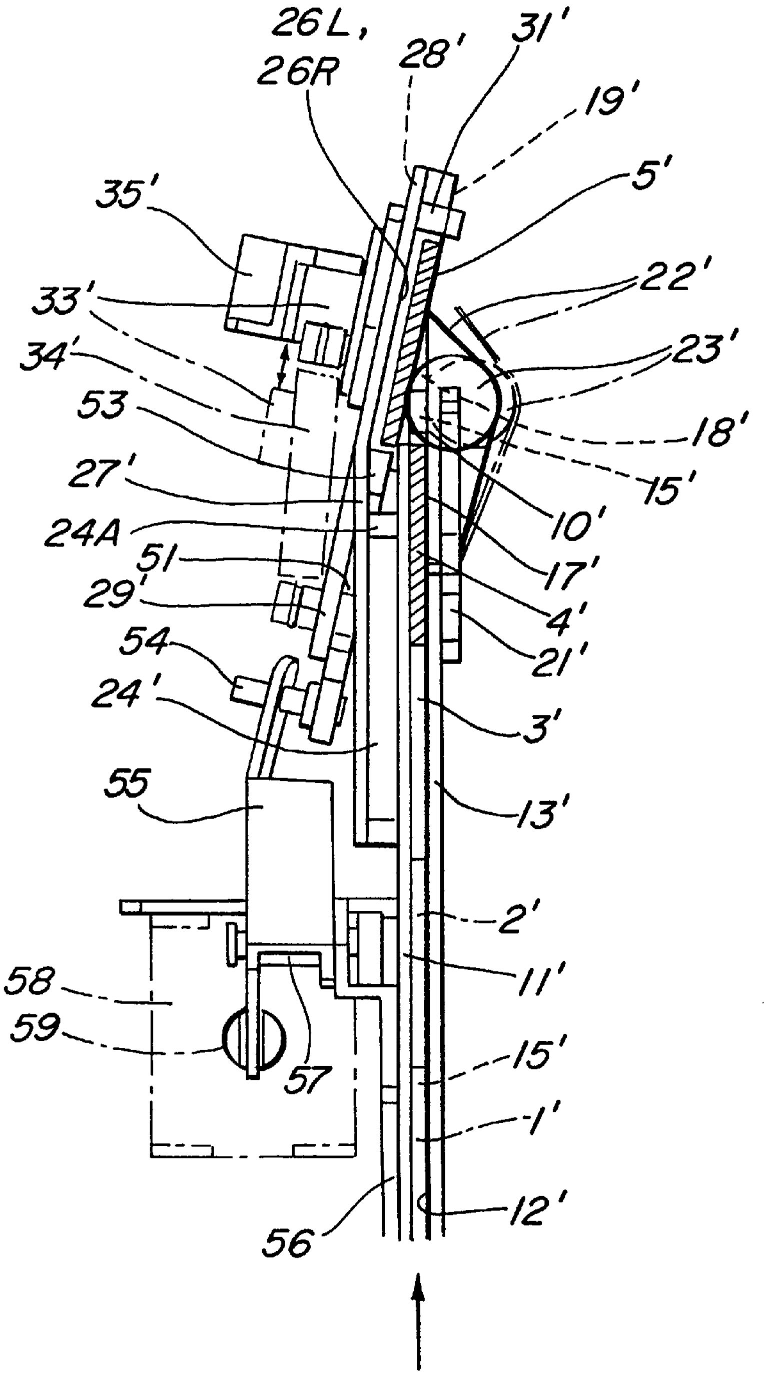
FIG. 4 is a side view in section of a second embodiment of apparatus according to the present invention.
Figure 5:
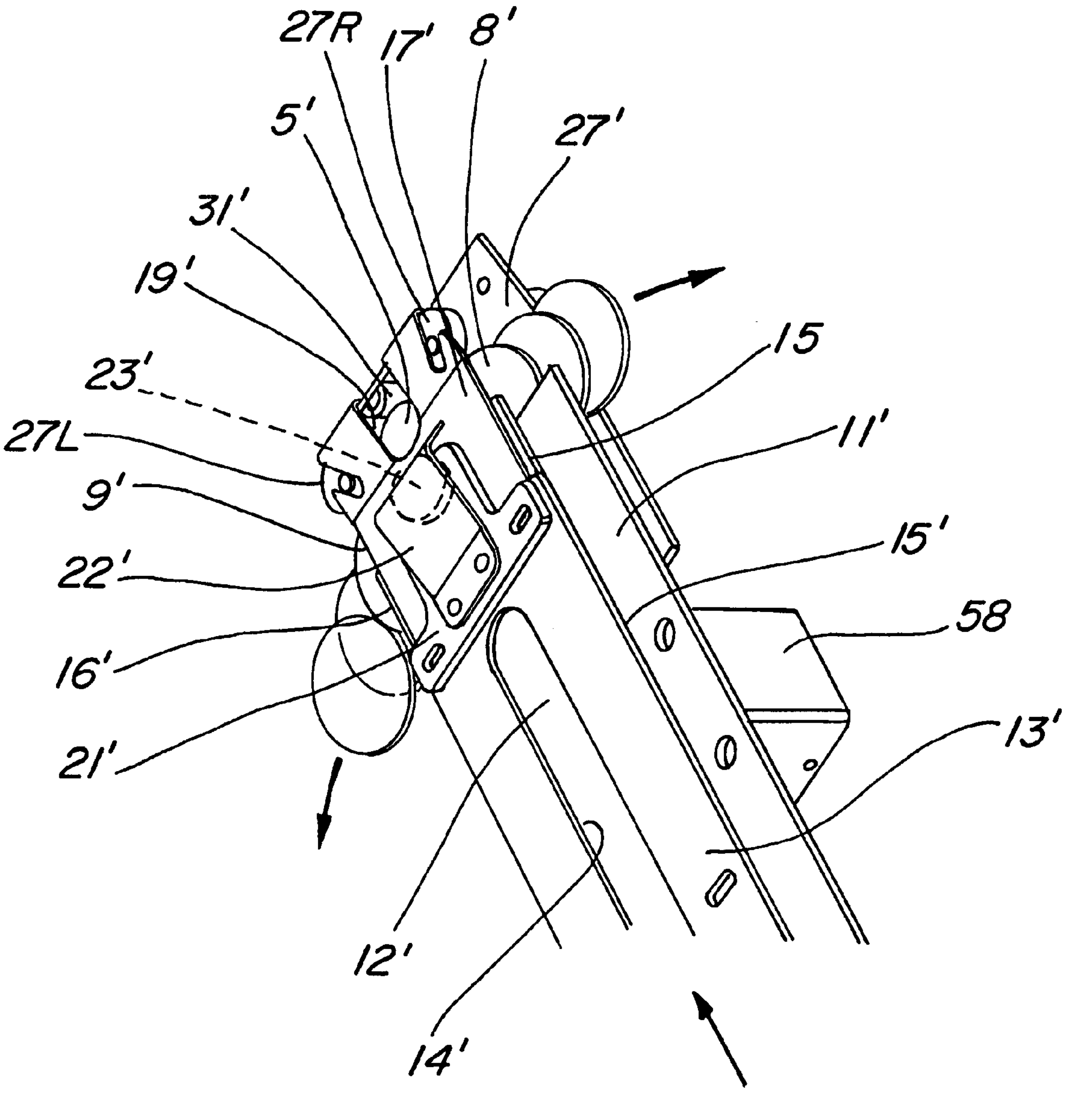
FIG. 5 is a perspective view of the front of the apparatus viewed from the right of FIG. 4.
Figure 6:
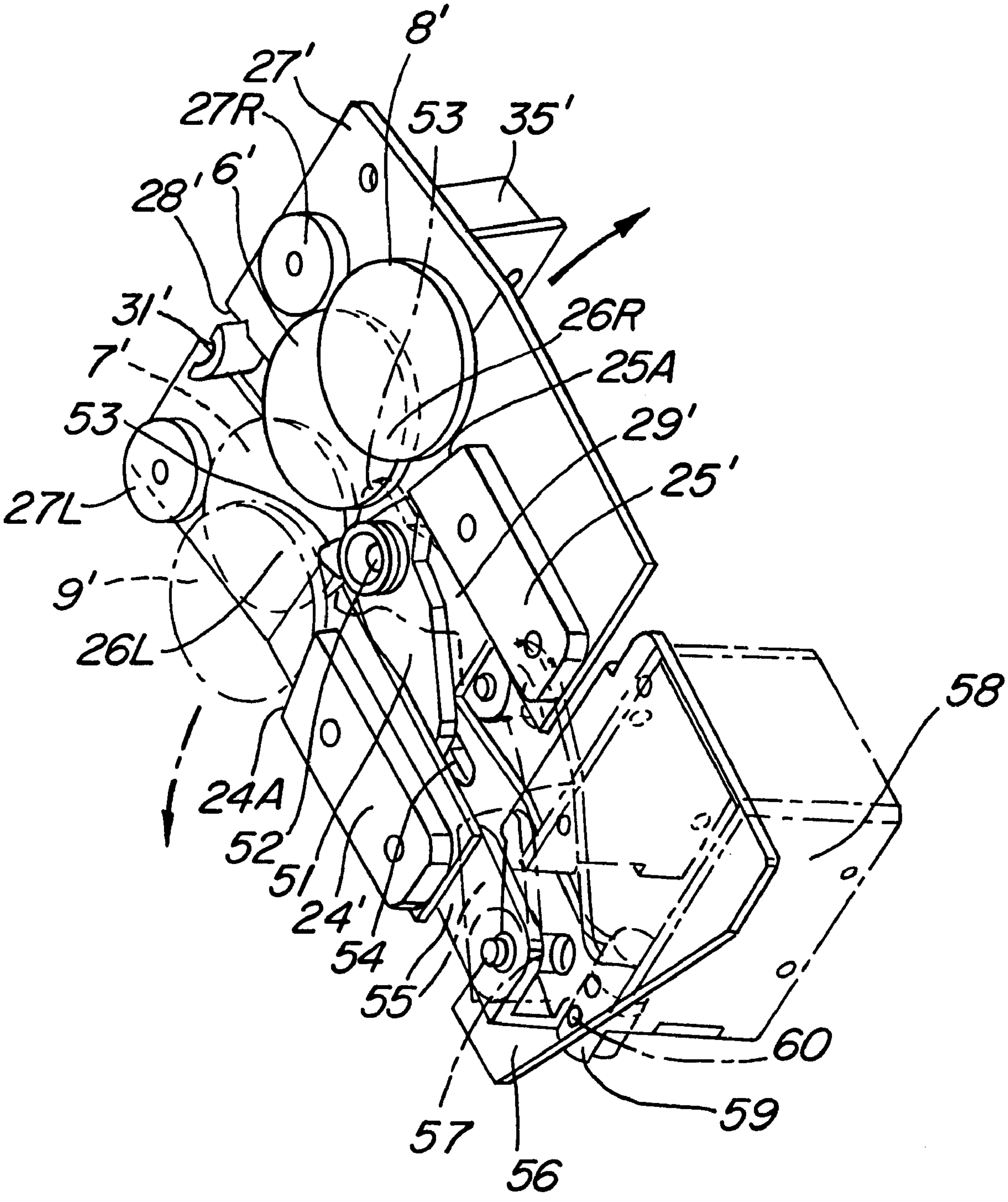
FIG. 6 is a perspective view corresponding to FIG. 5 with a number of parts removed.
Figure 7:
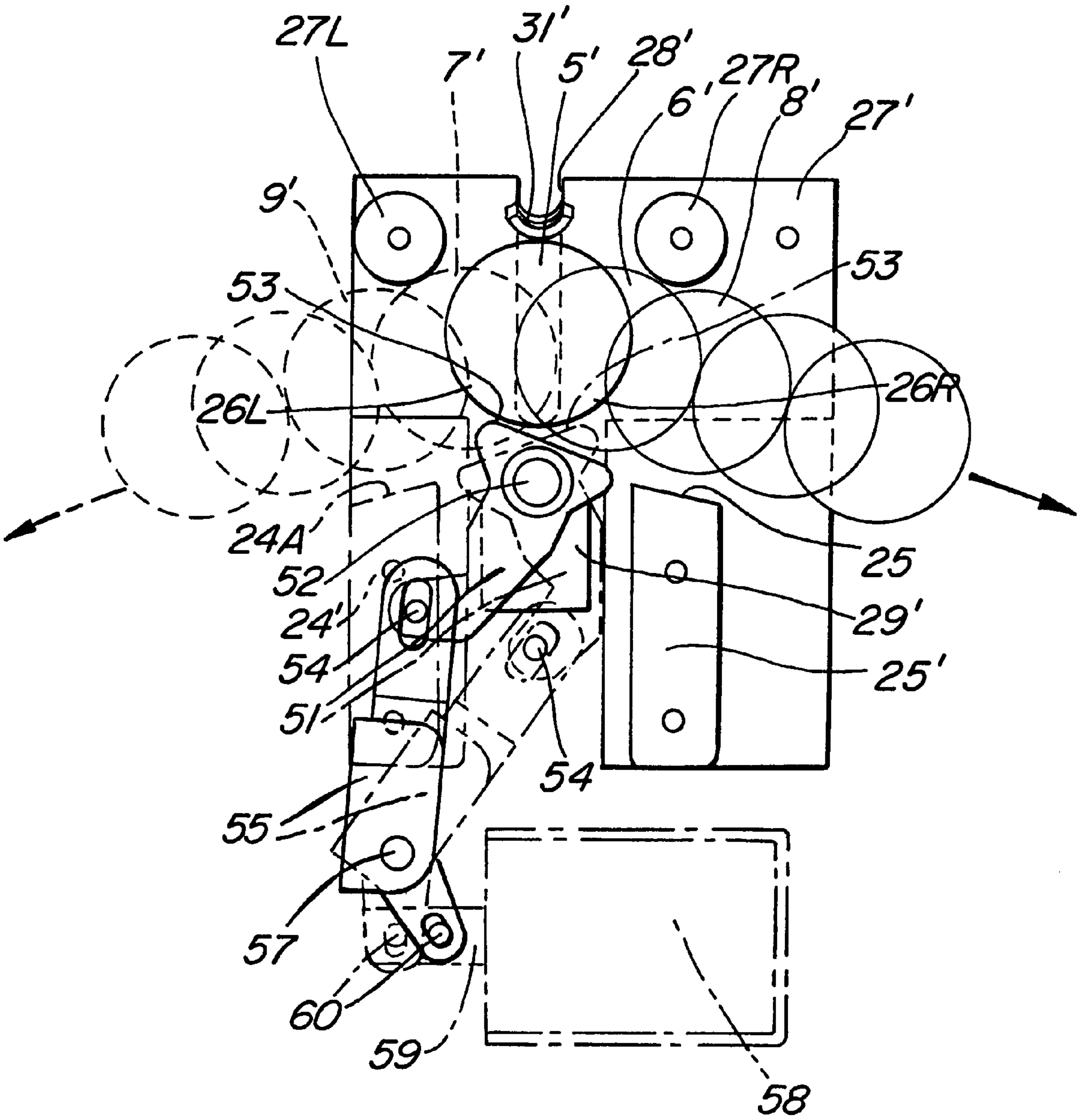
FIG. 7 is a front view of FIG. 6.
Figure 8:
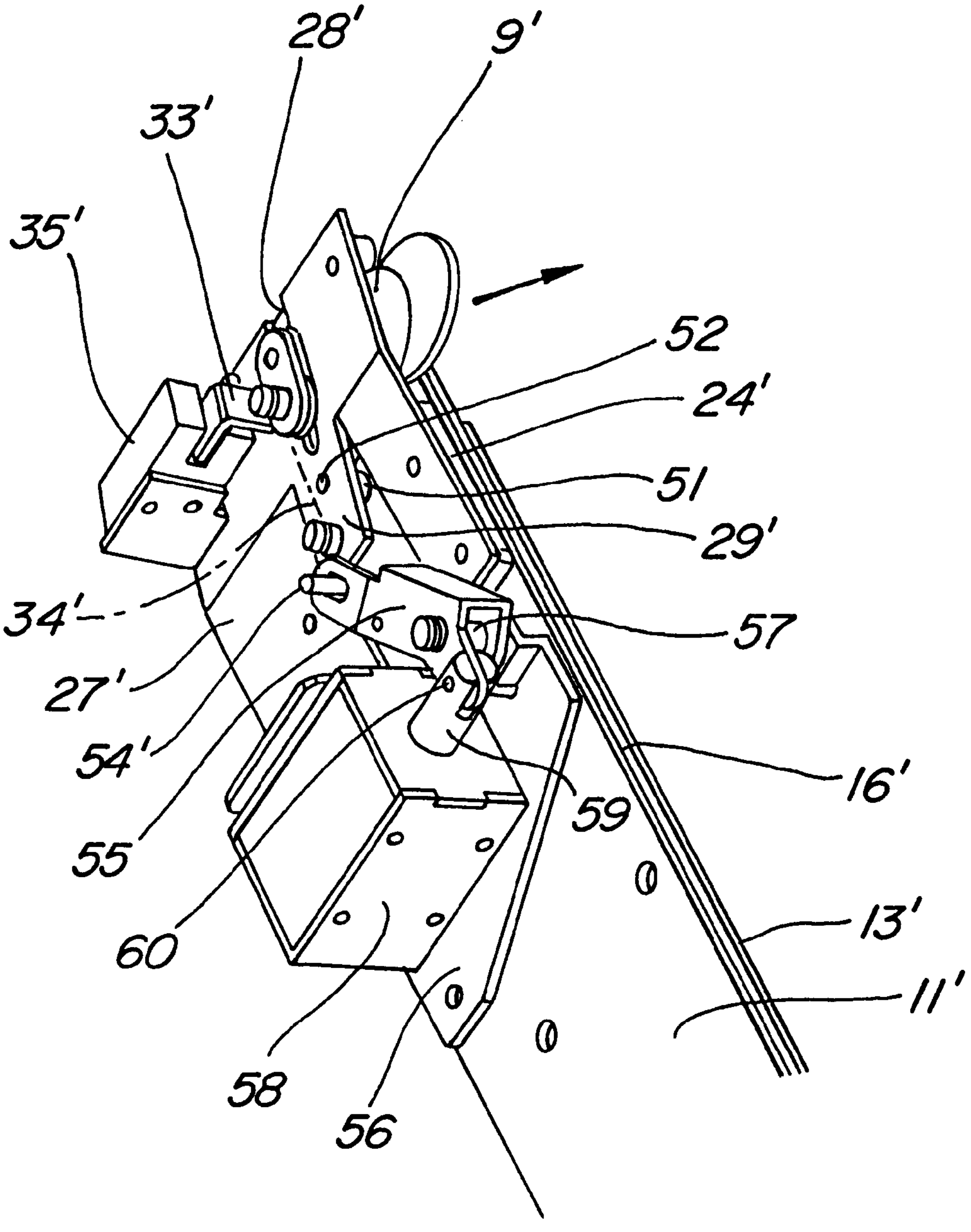
FIG. 8 is a perspective view of the back of the apparatus viewed from the left of FIG. 4.

A second example of apparatus according to the present invention is illustrated in FIGS. 4–8. A rectangular plate which is shown in FIG. 5 and FIG. 8 is a back plate 11'.

This back plate 11' defines a back wall of a passage 12' as shown in FIG. 4. The passage 12' carries disk bodies 1', 2', 3', 4' with the same shape which are pushed up from the lower portion in the same posture and arranged in a line. A band plate which is formed in parallel to the back plate 11' of FIG. 5 is a front plate 13' which defines a front wall of passage 12'.

The distance between the back plate 11' and the front plate 13' is equivalent to the thickness of any one of the disk bodies 1'–4' approximately. In addition, the upper edge of front plate 13' is formed lower than the upper edge of the back plate 11' and, at the center of the front plate 13', a slot 14' is formed. Moreover, between the back plate 11' and the front plate 13', one pair of slender edge plates 15', 16' are provided which define side walls of the passage 12'.

Further, the distance between one pair of the edge plates 15', 16' is equivalent to the diameter of any one of the disk bodies 1'–4' approximately. Also, the edge plates 15', 16' are higher and protrude beyond the back plate 11'. As above mentioned, the back plate 11', the front plate 13' and the one pair of edge plates 15', 16' define a passage for passing upwardly the disk bodies 1'–3' through. Further, an opening 10' (referring to FIG. 4 ) on the top of this passage is defined by the upper edge level of the back plate 11', as described later.

As shown in FIG. 5, a bent thin plate in the form of an X is a regulation plate 17'.

The lower edge of this regulation plate 17' is bent as shown in FIG. 4 and is fixed on the upper edge of front plate 13'. At the center of regulation plate 17', a circular hole 18' (referring to FIG. 4) is formed and, at the upper portion of regulation plate 17', a slot 19' (referring to FIG. 5) is formed.

A small M-shaped holding plate 21' has a lower portion fixed on the lower edge part of regulation plate 17'.

An L-shaped plate spring 22' has a lower portion fixed con the lower portion of holding plate 21'. A spherical body 23' which is shown at the upper portion of FIG. 4 and FIG. 5 is inserted freely into the holding plate 21' and held against the elasticity power of plate spring 22' and, generally, it is held by the circular hole 18' of the regulation plate 17' and the plate spring 22'. Also, the holding plate 21' prevents the spherical body 23' from spilling out on either side.

In the upper edge part of the back of the back plate 11', as shown in FIG. 6 and FIG. 7, a pair of small ridges 24', 25' are fixed respectively and have guide surfaces 24A, 25A which define lower walls of left-hand separating passage 26L and right-hand separating passage 26R, respectively. Items 5', 6' and 8' illustrate the successive positions of a disk being dispensed through the right-hand separating passage 26R. Items 5', 7' and 9' illustrate the successive positions of a disk being dispensed through the left-hand separating passage 26L.

A slightly bent rectangular plate which is shown in FIG. 6 and FIG. 7 is a mounting plate 27', and the plate 27' spans between the pair of ridges 24', 25' and defines a rear wall of separating passages 26R, 26L.

Incidentally, the distance between the back plate 11' and the mounting plate 27' is equivalent to twice the thickness of any one of the disk bodies 1'–4' approximately. Therefore, when the passage 12' must be adjusted according to the thickness of disk bodies 1'–4', it is often not necessary to adjust the passages 26R, 26L. Incidentally, at the center of the upper part of mounting plate 27', a slot 28' is formed and a slender raised fragment 29' is formed at the center. Also, at the mounting plate 27' near either side part of the slot 28', one pair of washers 27L, 27R are rotatably mounted. The washers 27L, 27R are spacers of the passages 26R, 26L and are guide bodies.

The symbol 31' of FIG. 6 and FIG. 7 indicates an arched end surface of a detection part, and this detection part 31' penetrates the slot 28', being slidably mounted.

On the back of this detection part 31', as shown on FIG. 8, an approximately zigzag movable bracket 33' is fixed.

The symbol 34' which is shown in FIG. 4 and in FIG. 8 indicates a tubular spring, and this spring 34' joins the movable bracket 33' and the raised fragment 29', and it biases the movable bracket 33' in the direction of raised fragment 29'. Symbol 35' is a laterally U-shaped sensor and detects the movement passage of movable part 33'. Sensor 35', in case of the illustration, is a proximity switch but a light sensor or a magnetic sensor are equally suitable. The detection part 31, the movable part 33', the spring 34', the sensor 35' and so on constitute a detection means.

At the center of FIG. 6 and FIG. 7, as shown, a J-shaped separating body 51 is pivoted to the raised fragment 29' as indicated at 52 in the upper part of the drawings. The body 51 has a guide surface 53 which guides disks into either passage 26L or 26R. On the lower portion of separating body 51, a pin 54 is set up. A box-shaped arm 55 shown at the center of FIG. 8 has a pin 54 inserted freely at its end. The arm 55 is mounted on a substantially triangular mounting plate 56 by a pivot 57 at approximated y the contra of the arm 55. The box which is shown in the lower portion of the drawing is a solenoid 58 and it is equipped with a pin 60 at the end of a plunger 59.

This pin 60 is inserted freely in the base end part of arm 55. Further, the solenoid 58 is mounted on the mounting plate 56. As for this embodiment, the disk bodies 1', 2', 3', 4' are pushed up into the passage 12' by means not shown, such as a well known medal hopper apparatus.

In this case, as shown in FIG. 4, the upper edge of the uppermost disk body 4' hits the spherical body 23'. When the disk body 4' is pushed further up, the spherical body 23' moves to the right of FIG. 4 against the elasticity power of plate spring 22' and the opening 10' in passage 12' is opened. Therefore, the disk body 4' which is pushed up the inside of passage 12' is moved further up.

When the lower edge of disk body 4' aligns with the opening 10' on clearing the upper edge of back plate 11', with the elasticity restoration power of plate spring 22', as shown by the solid line of FIG. 4, the spherical body 23' returns to the original position. As a result, the disk body 4' is pushed to the position indicated at 5' and the opening 10' in the passage 12' is covered or closed by the spherical body 23'.

The pushed out disk body in position 5' becomes free and, depending on the position of guide surface 53' in this case, this disk body is guided to either of the right and left passages 26. That is, as shown in FIG. 7, when the solenoid 58 is operated and the separating body 51 is in the position of the solid line, the guide surface 53 inclines to the right. Then, the disk body in position 5' is led to the right direction of FIG. 7 and falls to the right, as indicated by the positions indicated at 6', 8'. When the separating body 51 is in the position of the chain line of FIG. 7, the guide surface 53 inclines to the left. As a result, the disk body 5' is guided to the left direction of FIG. 7 and falls as indicated by disk bodies in positions 7', 9', namely, to the left.

Therefore, the separating body 51, the arm 55, the solenoid 58 and so on constitute a separating means.

In addition, as shown in FIG. 4, when moved from the position of disk body 4' to the position of disk body 5', the disk body 4' pushes up the detection part 31'. As a result, the movable bracket 33' is upwardly moved against the spring 34 and is detected by the sensor 35'. The disk body in position 5' which was accordingly pushed out by the sphere body 23' becomes free, and is led to either of the passages 26R, 26L and falls naturally. Also, the restoration power of spring 34' works and the speed of disk body in position 5' increases.

Incidentally, it is possible to say that the regulation plate 17', the circular hole 18', the holding plate 21', the plate spring 22', and the spherical body 23' constitute a structure to enable the spherical body 23' to be a closure member for opening and shutting the opening 10 in passage 12. As in the previous embodiment, the plate spring 22' and spherical body 23' may be formed integrally.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for dispensing disks, each disk having parallel faces and a peripheral edge comprising:

means defining a passage having an outlet in which the disks are arranged edge-to-edge in use with the parallel faces of the disk being parallel to a plane extending along the passage;

a movable closure member for closing the outlet; and a biasing means which biases the closure member in a direction approximately traverse to the plane towards a closed position in which the outlet is closed with the closure member being in the plane, wherein the closure member is arranged to apply a traverse force to a face of a disk in the region of the outlet when a peripheral edge of a disk cams the closure member out of the plane whereby the disk is dispensed from the outlet by the applied traverse force.

2. The apparatus according to claim 1 wherein the closure member is opened by the action of the disk in the region of the outlet.

3. The apparatus according to claim 1 wherein the biasing means comprises a plate spring.

4. The apparatus according to claim 1 wherein the closure member comprises a rotatable member which is engaged by the disk in the region of the outlet.

5. The apparatus according to claim 4 wherein the rotatable member comprises a freely rotatable spherical body.

6. The apparatus according to claim 1 further comprising a detector for detecting the presence of a disk in the region of the outlet, wherein the detector provides a detection signal when the disk has been dispensed from the outlet.

7. The apparatus according to claim 6 wherein the detector comprises a detection member which is biased towards and engaged by a disk in the region of the outlet.

8. The apparatus according to claim 1 further comprising a guide for guiding a disk which has been dispensed from the outlet.

9. The apparatus according to claim 8 wherein the guide is movable between first and second positions in which the disk is guided to the right or left of the outlet.

10. The apparatus according to claim 9 further comprising a solenoid for moving the guide between its first and second positions.

11. A coin dispensing ejector apparatus for receiving and dispensing a coin from an aperture in a chute supporting a column of coins, comprising:

a movable member is mounted to block the aperture of the chute;

a biasing member provides a predetermined force to the movable member which must be overcome by the coin to clear the movable member from the aperture, the biasing member further forces the movable member to exert a force on a side face of the coin as the movable member is returned to block the aperture;

guide means for receiving the coin after it overcame the predetermined force and is moved traverse to the column of coins; and an ejector member operative associated with the guide means and contacting the coins for exerting a second force on the coin as it is dispensed.

12. The invention of claim 11 wherein the movable member is a spherical member.

13. The invention of claim 12 wherein the biasing member is a plate spring with an indent of a configuration to receive the spherical member.

14. The invention of claim 11 wherein the ejector member includes a roller member which is spring biased for engaging the coin as it moves past the movable member.

15. The invention of claim 11 further including a detector member which determines the displacement of the ejector member.

16. The invention of claim 11 wherein the movable member and the biasing member are integrally formed.

17. In a coin storage system for dispensing coins from a bulk storage container wherein the coins are individually removed from the container and are forced in a sequential manner through a passageway to an outlet, the improvement of a coin dispenser operatively mounted to control the release of coins from the outlet comprising:

a closure member having a convex surface operatively positioned to block the outlet;

a biasing member holding the closure member with a predetermined force in the position to block the outlet; and a guide assembly operatively positioned adjacent and offset from the outlet whereby the closure member is initially displaced from the outlet to permit passage of the coin as an edge of the coin cams the convex surface of the closure member and forces it away from the opening against the predetermined force until the coin clears the outlet, whereby the biasing member causes the closure member to push a side surface of the coin and forces the coin from the outlet into the guide assembly.

18. The invention of claim 17 wherein the closure member is a spherical member.

19. The invention of claim 18 wherein the spherical member is of a size smaller than a diameter of a coin.

20. The invention of claim 18 wherein the biasing member is a leaf plate spring that holds the spherical member and permits relative rotation of the spherical member.

21. The invention of claim 17 wherein the guide assembly includes a guide member and means for moving the guide member to a first position and a second position so that a portion of the guide member can direct the coin after it clears the outlet to respectively a first direction and a second direction.

22. The invention if claim 21 further including a detector member mounted adjacent the guide assembly to determine the presence of a coin.

23. The invention of claim 17 further including an ejector member operatively positioned in the guide assembly to provide an ejecting force on the coin member when it clears the outlet.

24. An apparatus for dispensing disks comprising:

means defining a passage having an outlet in which the disks are arranged edge-to-edge in use;

a closure member for closing the outlet;

a guide member for guiding discs dispensed from the outlet; and a biasing means which biases the closure member towards a closed positioned in which the outlet is closed, wherein the closure member is arranged to apply force to a face of a disk in the region of the outlet whereby the disk is dispensed from the outlet to the guide member.

25. A coin dispensing ejector apparatus for receiving and dispensing a coin from an aperture in a chute supporting a column of coins, comprising:

a movable spherical member mounted to block the aperture of the chute;

a biasing member providing a predetermined force to the movable member which must be overcome by the coin the clear the movable member from the aperture;

guide means for receiving the coin after it overcame the predetermined force; and an ejector member operative associated with the guide means for exerting a force on the coin as it is dispensed.

26. A coin dispensing ejector apparatus for receiving the dispensing a coin from an aperture in a chute supporting a column of coins, comprising:

a movable member mounted to block the aperture of the chute;

a biasing plate spring, with an indent of a configuration to receive the movable member, providing a predetermined force to the movable member which must be overcome by the coin the clear the movable member from the aperture;

guide means for receiving the coin after it overcame the predetermined force; and an ejector member operative associated with the guide means for exerting a force on the coin as it is dispensed.

27. A coin dispensing ejector apparatus for receiving and dispensing a coin from an aperture in a chute supporting a column of coins, comprising:

a movable member is mounted to block the aperture of the chute;

a biasing member providing a predetermined force to the movable member which must be overcome by the coin to clear the movable member from the aperture;

guide means for receiving the coin after it overcame the predetermined force;

an ejector member operative associated with the guide means for exerting a force on the coin as it is dispensed; and a detector member which determines the displacement of the ejector member.

28. In a coin storage system for dispensing coins from a bulk storage container wherein the coins are individually removed from the container and are forced in a sequential manner through a passageway to an outlet, the improvement of a coin dispenser operatively mounted to control the release of coins from the outlet comprising:

a closure member having a convex surface operatively positioned to block the outlet;

spring member with an indent for holding the closure member with a predetermined force in a position to block the outlet; and a guide assembly operatively positioned adjacent and offset from the outlet whereby the closure member is initially displaced from the outlet to permit passage of the coin as an edge of the coins cams the convex surface of the closure member and forces it away from the opening against the predetermined force until the coin clears the outlet, whereby the spring member causes the closure member to push a side surface of the coin and forces the coin from the outlet into the guide assembly.

29. In a coin storage system for dispensing coins from a bulk storage container wherein the coins are individually removed from the container and are forced in a sequential manner through a passageway to an outlet, the improvement of a coin dispenser operatively mounted to control the release of coins from the outlet comprising:

a closure member having a convex surface operatively positioned to block the outlet;

a biasing member holding the closure member with a predetermined force in the position to block the outlet; and a guide assembly operatively positioned adjacent and offset from the outlet whereby the closure member is initially displaced from the outlet to permit passage of the coin as an edge of the coin cams the convex surface of the closure member and forces it away from the opening against the predetermined force until the coin clears the outlet, whereby the biasing member causes the closure member to push a side surface of the coin and forces the coin from the outlet into the guide assembly, wherein the guide assembly includes a guide member and means for moving the guide member to a first position and a second position so that a portion of the guide member can direct the coin after it clears the outlet to respectively a first direction and a second direction.

30. In a coin storage system for dispensing coins from a bulk storage container wherein the coins are individually removed from the container and are forced in a sequential manner through a passageway to an outlet, the improvement of a coin dispenser operatively mounted to control the release of coins from the outlet comprising:

a closure member mounted on a first side of the passageway and movable to releasably block the outlet and to exert a first discharge force against a side face of a coin after it has been released and the coin is discharged from the outlet;

a first biasing member holding the closure member with a predetermined force in a position to block the outlet;

a guide assembly operatively positioned adjacent and offset from the outlet on a second side of the passageway to receive a coin discharged from the outlet including, a second member positioned to contact an edge of a coin and to exert a second force on the coin as the coin is discharged whereby the closure member is initially displaced from the outlet to permit passage of the coin as an edge of the coin cams a surface of the closure member and forces it away from the opening against the predetermined force until the coin clears the outlet, whereby the biasing member causes the closure member to push a side surface of the coin with the first discharge force to more the coin from the outlet into the guide assembly and the second member exerts the second force as the coin is discharged.

31. In a coin storage system for dispensing coins from a bulk storage container wherein the coins are individually removed from the container and are forced in a sequential manner through a passageway to an outlet, the improvement of a coin dispenser operatively mounted to control the release of coins from the outlet comprising:

a closure member mounted on a first side of the passageway and movable to releasably block the outlet and to exert a discharge force against a side face of a coin after it has been released and the coin is discharged from the outlet;

a first biasing member holding the closure member with a predetermined force in a position to block the outlet;

a guide assembly operatively positioned adjacent and offset from the outlet on a second side of the passageway to receive a coin discharged from the outlet including a detector assembly to provide a signal when the coin is discharged whereby the closure member is initially displaced from the outlet to permit passage of the coin as an edge of the coin cams a surface of the closure member and forces it away from the opening against the predetermined force until the coin clears the outlet, whereby the biasing member causes the closure member to push a side surface of the coin and forces the coin from the outlet into the guide assembly.

* * * * *